United States Patent
Vignali et al.

(10) Patent No.: US 11,434,010 B2
(45) Date of Patent: Sep. 6, 2022

(54) ENVIRONMENTAL CONTROL SYSTEMS AND METHODS OF CONTROLLING AIRFLOW THROUGH ENVIRONMENTAL CONTROL SYSTEMS

(71) Applicant: Hamilton Sundstrand Corporation, Charlotte, NC (US)

(72) Inventors: Mark Vignali, Simsbury, CT (US); Jeffrey Ernst, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 825 days.

(21) Appl. No.: 16/271,507

(22) Filed: Feb. 8, 2019

(65) Prior Publication Data
US 2020/0255153 A1 Aug. 13, 2020

(51) Int. Cl.
| | |
|---|---|
| *B64D 13/00* | (2006.01) |
| *B64D 13/06* | (2006.01) |
| *G05B 13/00* | (2006.01) |
| *G05B 11/42* | (2006.01) |
| *G05D 7/06* | (2006.01) |
| *F24F 11/00* | (2018.01) |

(52) U.S. Cl.
CPC .............. *B64D 13/06* (2013.01); *G05B 11/42* (2013.01); *G05B 13/00* (2013.01); *G05D 7/0635* (2013.01); *B64D 2013/0618* (2013.01); *F24F 2011/0002* (2013.01); *Y02T 50/50* (2013.01)

(58) Field of Classification Search
CPC .... B64D 13/06; B64D 13/0618; G05B 11/42; G05B 13/00; G05D 7/0635; F24F 2011/0002; F02C 6/08; Y02T 50/50
See application file for complete search history.

(56) References Cited

U.S. PATENT DOCUMENTS

| | | | |
|---|---|---|---|
| 5,145,124 A | 9/1992 | Brunskill et al. | |
| 6,070,418 A | 6/2000 | Crabtree et al. | |
| 9,797,314 B2* | 10/2017 | Hillel | F02C 3/04 |
| 2016/0214723 A1* | 7/2016 | Fox | B64D 13/06 |

(Continued)

FOREIGN PATENT DOCUMENTS

EP 3050801 B1 8/2016

OTHER PUBLICATIONS

Extended European Search Report; Application No. 19210056.8; dated Jun. 29, 2020; 7 pages.

*Primary Examiner* — Phutthiwat Wongwian
*Assistant Examiner* — Sherman D Manley
(74) *Attorney, Agent, or Firm* — Cantor Colburn LLP

(57) ABSTRACT

A method of controlling air flow in an environmental control system includes receiving a target total flow value and a combined flow measurement at an outer control loop module. A first air flow reference value is determined based on the target total flow value and the combined flow measurement using the outer control loop module. The first air flow reference value is communicated to an inner control loop module and a flow control valve command determined based at least in part on the first air flow reference value using the inner control loop module. The flow control valve command is communicated to a flow control valve operatively associated with the inner control loop module to control flow through the ECS using the flow control valve. Environmental control systems and computer program products are also described.

19 Claims, 4 Drawing Sheets

(56) References Cited

U.S. PATENT DOCUMENTS

| | | |
|---|---|---|
| 2017/0268431 A1 | 9/2017 | Schwarz |
| 2017/0349290 A1 | 12/2017 | Linert et al. |
| 2018/0057170 A1* | 3/2018 | Sautron .................... F02C 6/08 |
| 2018/0057171 A1* | 3/2018 | Sautron .................. B64D 13/06 |
| 2018/0057172 A1* | 3/2018 | Sautron .................. B64D 13/06 |
| 2018/0065752 A1* | 3/2018 | Franco .................. B64D 13/06 |
| 2018/0215472 A1* | 8/2018 | DeFrancesco ......... B64D 13/06 |
| 2018/0312262 A1* | 11/2018 | Wiegers .................... F04F 5/48 |

* cited by examiner

ENVIRONMENTAL CONTROL SYSTEMS AND METHODS OF CONTROLLING AIRFLOW THROUGH ENVIRONMENTAL CONTROL SYSTEMS

BACKGROUND

The present disclosure relates to environmental control systems, and more particularly to control of air flows through environmental control systems.

Aircraft commonly employ aircraft cabin pressurization systems to supply air for the cabin air conditioning system. The aircraft cabin pressurization system generally uses bleed air from the engine compressor, which is routed through a heat exchanger and a compressor prior to provision to the aircraft cabin. The use of bleed air from the engine compressor allows the aircraft cabin to be maintained at desirable conditions irrespective of the flight condition of the aircraft. The amount of bleed air from the engine compressor is typically controlled to limit the efficiency loss to the engine associated with the bleed air extracted from the compressor.

Such systems and methods have generally been considered suitable for their intended purpose. However, there remains a need for improved methods of controlling flow through environmental control systems, environmental control systems, and computer program products for controlling flow through environmental control systems. The present disclosure provides a solution to this need.

BRIEF DESCRIPTION

A method of controlling air flow in an environmental control system (ECS) is provided. The method includes receiving a target total flow value and a combined flow measurement at an outer control loop module. A first air flow reference value is determined based on the target total flow value and the combined flow measurement using the outer control loop module. The first air flow reference value is communicated to an inner control loop module and a flow control valve command determined based at least in part on the first air flow reference value using the inner control loop module. The flow control valve command is communicated to a flow control valve operatively associated with the inner control loop module to control flow through the ECS using the flow control valve.

In addition to one or more of the features described above, or as an alternative, further embodiments may include changing air flow through both the first air conduit and the second air conduit using the flow control valve.

In addition to one or more of the features described above, or as an alternative, further embodiments may include wherein receiving the combined flow measurement comprises receiving a measurement of ECS output air flow to an aircraft cabin.

In addition to one or more of the features described above, or as an alternative, further embodiments may include wherein receiving the combined flow measurement comprises receiving a first air flow measurement and a second air flow measurement, the method further comprising adding the first air flow measurement to the second air flow measurement.

In addition to one or more of the features described above, or as an alternative, further embodiments may include (a) receiving a first air flow at the first air conduit, (b) receiving a second air flow at the second air conduit, (c) combining the first air flow and the second air flow within the ECS, and (d) communicating the combined first air flow and the second air flow system to an enclosure as an ECS output flow.

In addition to one or more of the features described above, or as an alternative, further embodiments may include wherein the first air flow is a bleed air flow, wherein the second air flow is an ambient air flow.

In addition to one or more of the features described above, or as an alternative, further embodiments may include wherein determining the first air flow reference value comprises employing a proportional-integral control algorithm.

In addition to one or more of the features described above, or as an alternative, further embodiments may include wherein determining the flow control valve command comprises employing a proportional-integral control algorithm.

An ECS is also provided. The ECS includes a first air conduit and a second air conduit; a turbine in fluid communication with the first air conduit; a compressor in fluid communication with the second air conduit, wherein the compressor is operatively associated with the turbine; and a flow control valve arranged along the first air conduit. A controller having an inner control loop module cascaded with an outer control loop module is operatively connected to the flow control valve and is responsive to instructions recorded on a memory to a controller to (a) receive a target total flow value and a combined flow measurement at the outer control loop module, (b) determine a first air flow reference value based on the target total flow value and the combined flow measurement using the outer control loop module, (c) communicate the first air flow reference value to the inner control loop module, (d) determine a flow control valve command based at least in part on the first air flow reference value using the inner control loop module, and (e) communicate the flow control valve command to the flow control valve.

In addition to one or more of the features described above, or as an alternative, further embodiments may include a compressor section of a gas turbine engine connected to the first air conduit by a bleed valve.

In addition to one or more of the features described above, or as an alternative, further embodiments may include an ambient air intake connected to the second air conduit.

In addition to one or more of the features described above, or as an alternative, further embodiments may include a union connecting the second air conduit to the first air conduit.

In addition to one or more of the features described above, or as an alternative, further embodiments may include wherein the turbine has a turbine outlet, wherein the union is arranged downstream of the turbine outlet.

In addition to one or more of the features described above, or as an alternative, further embodiments may include wherein the compressor has a compressor outlet, wherein the union is arranged downstream of the compressor outlet.

In addition to one or more of the features described above, or as an alternative, further embodiments may include a combined flow sensor arranged between the union and an enclosure connected to the ECS.

In addition to one or more of the features described above, or as an alternative, further embodiments may include a first air flow sensor in communication with the first air conduit, the first air sensor arranged to provide a first air flow measurement of a first air flow in the first air conduit, and a second air flow sensor in communication with the second air conduit, the second air flow sensor arranged to provide a second air flow measurement of a second air flow in the second air conduit, wherein the instructions further cause the controller to provide the combined flow measurement to the outer control module by adding the first air flow measurement to the second air flow measurement.

In addition to one or more of the features described above, or as an alternative, further embodiments may include a first air flow sensor in communication with the first air conduit and arranged provide the first air flow measurement to the inner control module.

In addition to one or more of the features described above, or as an alternative, further embodiments may include wherein the outer control loop module comprises a proportional-integral control algorithm, wherein the inner control loop module comprises a proportional-integral control algorithm.

A computer program product tangibly embodied on a computer readable medium is additionally provided. The computer program product including instructions that, when executed by a processor, cause the processor to execute operations including (a) receiving a target total flow value at an outer control loop module, (b) receiving a combined flow measurement at the outer control loop module, (c) determining a first air flow reference value based on the target total flow value and the combined flow measurement using the outer control loop module, (d) communicating the first air flow reference value to an inner control loop module, (e) determining a flow control valve command based at least in part on the first air flow reference value using the inner control loop module, and (f) communicating the flow control valve command to a flow control valve operatively associated with the inner control loop module.

Technical effects of embodiments of the present disclosure can allow a single flow control valve to control flow of two air flows provided to an ECS, reducing complexity of the system and system control in comparison with systems controlling two flows independently. Technical of embodiments of the present disclosure can also provide relatively rapid bleed flow control and disturbance control in comparison to alternative control schemes. Directly controlling bleed flow can also simplify satisfying the maximum allowable bleed for requirement.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
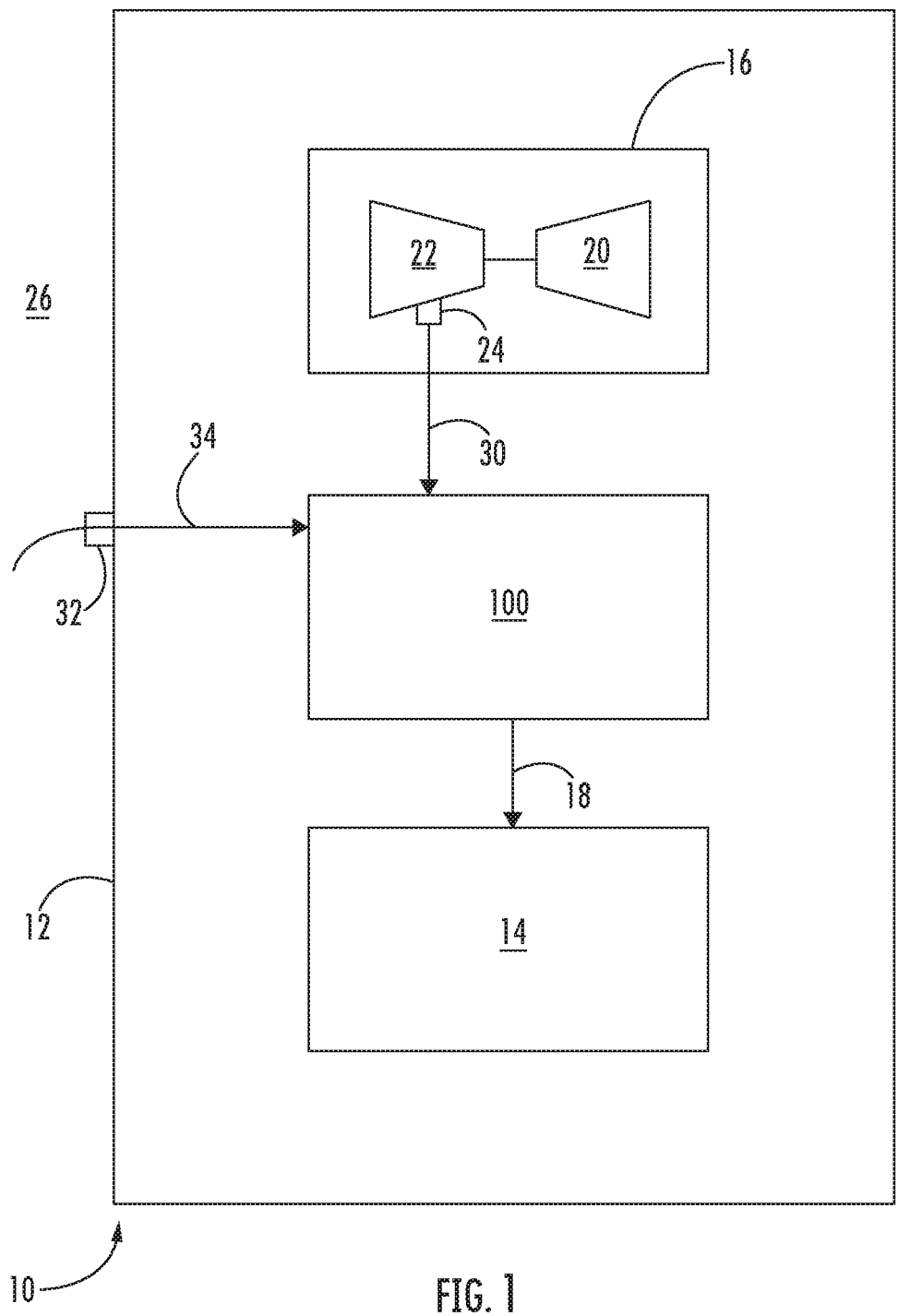
FIG. 1 is a schematic view of an environmental control system (ECS) constructed in accordance with the present disclosure, showing the ECS carried by an aircraft and receiving both a compressed bleed air flow from a gas turbine engine and an uncompressed ambient air flow from the environment external to the aircraft.

Reference will now be made to the drawings wherein like reference numerals identify similar structural features or aspects of the subject disclosure. For purposes of explanation and illustration, and not limitation, a partial view of an exemplary embodiment of an environmental control system (ECS) in accordance with the disclosure is shown in FIG. 1 and is designated generally by reference character 100. Other embodiments of methods of controlling airflow through environmental control systems, environmental control systems, and computer program products for controlling flow through environmental control systems in accordance with the disclosure, or aspects thereof, are provided in FIGS. 2-4, as will be described. The systems and methods described herein can be used for environmental control systems supplied air from two or more sources, such as compressed bleed air from a gas turbine engine compressor section and uncompressed ambient air from the external environment, through the present disclosure is not limited to environmental air control systems employing ambient air flows or to aircraft environmental control systems in general.

Referring to FIG. 1, an aircraft 10 is shown. The aircraft 10 includes an enclosure 12 containing a cabin 14, a gas turbine engine 16, and the ECS 100. The enclosure 12 encloses the cabin 14 such that the environment within the cabin 14 can be maintained to within a predetermined pressure and temperature range. To maintain pressure and temperature within the cabin 14 within the predetermined pressure and temperature range the ECS 100 provides an ECS output air flow 18 to the cabin 14. The cabin 14 can enclose, for example, a portion of an aircraft fuselage housing the aircraft flight deck, a crew space, and/or a passenger space of the aircraft 10.

The gas turbine engine 16 includes a turbine section 20, a compressor section 22, and a bleed valve 24. The turbine section 20 is configured to extract work by expanding a working fluid flow provided thereto. The compressor section 22 is configured to ingest ambient air from the external environment 26, compress the ingested ambient air using work provided by the turbine section 20 to form a compressed gas flow, and communicate the compressed gas flow to a combustion section to generate the working fluid flow provided to the turbine section 20. The bleed valve 24 connects the ECS 100 to the compressor section 22 and is configured to provide a portion of the compressed gas flow to the ECS 100 as a first air flow 30, e.g., a bleed air flow, to the ECS 100.

The ECS 100 receives both the first air flow 30 and a second air flow 34, e.g., an uncompressed ambient air flow, from an ambient air intake 32 carried by the aircraft 10, which is in fluid communication with the ambient external environment 26 outside the aircraft 10. The ECS 100 combines the second air flow 34 with the first air flow 30 and provides the combined flow an ECS output air flow 18 to the enclosure 12. While shown and described herein with the compressor section 22 of the gas turbine engine 16, it is to be understood and appreciated that other sources of pressurized gas can be employed and remain within the scope of the present disclosure, such as gas bottles, ground cart-mounted compressors, fan air, and/or ram air, as suitable for an intended application.

Figure 2:
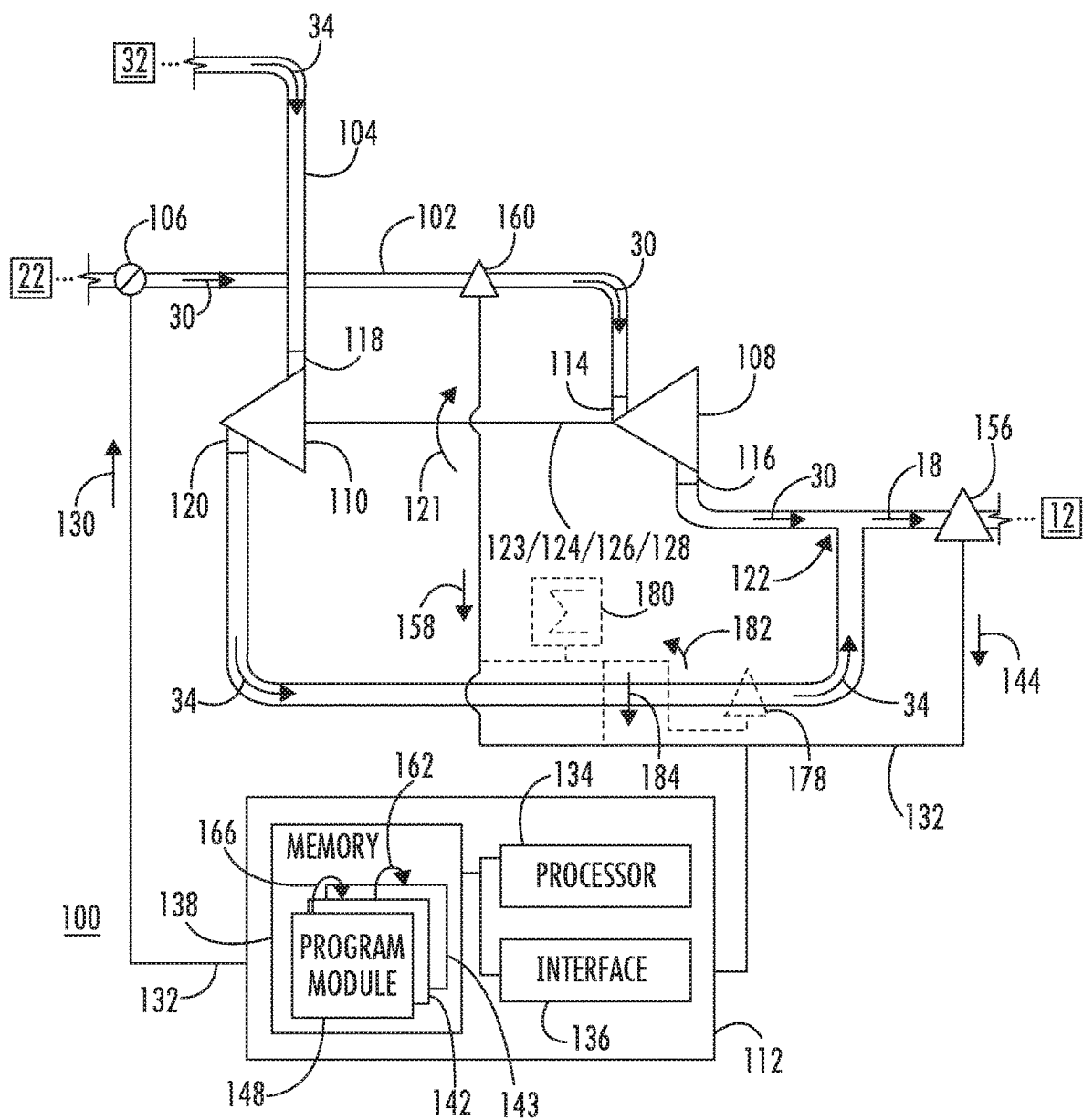
FIG. 2 is schematic view of the ECS of FIG. 1, showing a controller controlling an ECS output air flow using an outer control loop module and an inner control loop module operatively connected to a flow control valve.

With reference to FIG. 2, the ECS 100 is shown. The ECS 100 includes a first air conduit 102, a second air conduit 104, and a flow control valve 106. The ECS 100 also includes a turbine 108, a compressor 110, and a controller 112. The first air conduit 102 connects the bleed valve 24 to the enclosure 12 through the flow control valve 106 and turbine 108, the flow control valve 106 arranged between the bleed valve 24 and the turbine 108. In this respect the turbine 108 has a turbine inlet 114 and a turbine outlet 116, the turbine outlet 116 connected to the flow control valve 106 through the turbine inlet 114.

The second air conduit 104 connects the ambient air intake 32 to the compressor 110, and therethrough to the enclosure 12 through the first air conduit 102. In this respect the compressor 110 has a compressor inlet 118 and a compressor outlet 120. The ambient air intake 32 is connected to the compressor inlet 118, and therethrough to the compressor outlet 120. A union 122 is located downstream of both the compressor outlet 120 and the turbine outlet 116, the union 122 connecting the second air conduit 104 to the first air conduit 102. The first air flow 30 and the second air flow 34 combine at the union 122 to form the ECS output air flow 18, which the ECS 100 provides to the enclosure 12.

The turbine 108 is configured to extract work 121 from the first air flow 30 as the first air flow 30 traverses the turbine 108, and is the operatively connected to the compressor 110. Connection of the turbine 108 to the compressor 110 can be, for example, via one or more of a shaft 123, a gear 124, a chain 126, and/or a belt 128, as suitable for an intended application. As will be appreciated by those of skill in the art in view of the present disclosure, operative connection of the turbine 108 to the compressor 110 enables the turbine 108 to power the compressor 110 using work 121 extracted from the first air flow 30 as the first air flow 30 traverses the turbine 108. This limits the efficiency loss associated with bleeding a portion of the compressed gas flow generated by the compressor section 22 (shown in FIG. 1) of the gas turbine engine 16 (shown in FIG. 1) as the first air flow 30.

The compressor 110 is configured to compress the second air flow 34 as the second air flow 34 traverses the compressor 110. More specifically, the compressor 110 compresses the second air flow 34 as the second air flow 34 traverses the compressor 110 according to the amount of work 121 communicated to the compressor 110 by the turbine 108. The amount of work 121 communicated to the compressor 110 by the turbine 108 in turn depends upon the mass flow rate of first air flow 30 provided to the turbine 108 by the first air conduit 102. The actual mass flow rate of first air flow 30 provided to the ECS 100 during operation is in turn controlled by the flow control valve 106.

The flow control valve 106 is configured and adapted for modulating, i.e., increasing or decreasing, the mass flow rate of the first air flow 30 according to a flow control valve command signal 130 received from the controller 112. As will be appreciated by those of skill in the art in view of the present disclosure, changing mass flow rate of the first air flow 30 changes the mass flow rate of the second air flow 34 according to the change in work 121 extracted by the turbine 108 from the first air flow 30. In this respect the flow control valve 106 is operatively associated with the controller 112, for example, through a communication link 132 connecting the controller 112 to the flow control valve 106. It is contemplated that the communication link 132 can be wired, wireless, analog, and/or digital, as suitable for an intended application.

The controller 112 includes a processor 134, a device interface 136, and a memory 138. The memory 138 includes a non-transitory machine-readable medium having a plurality of program modules 140 recorded on the memory 138. The plurality of program modules 140 have instructions that, when read by the processor 134, cause the controller 112 to execute certain operations. Among those operations include the operations of a method 200 (shown in FIG. 4) of controlling air flow through the ECS 100. In the is respect the plurality of program modules 140 include an outer control loop module 142 cascaded with an inner control loop module 143 for controlling, e.g., regulating, the mass flow rate of the first air flow 30 and the second air flow 34 through the first air conduit 102 and the second air conduit 104, respectively. Control is effected by the flow control valve command signal 130, which is generated by the controller 112 using the outer control loop module 142 and the cascaded inner control loop module 143, and which is based on a first air flow measurement 158 and one of a combined flow measurement 144 and a combined flow measurement 184. In certain embodiments, the memory 138 can have recorded on it a target total flow value 148, which is the desired value of total flow from the ECS 100.

The first air flow measurement 158 is provided by a first air flow sensor 160. The first air flow sensor 160 is in communication with the first air conduit 102 at a location between the bleed valve 24 and the turbine 108, and is arranged to provide the first air flow measurement 158 to the controller 112.

In certain embodiments the combined flow measurement 144 is provided by an ECS output air flow sensor 156. It is contemplated that the ECS output air flow sensor 156 be in communication with the first air conduit 102 at a location between the union 122 and the enclosure 12. This allows a single ECS output air flow sensor to provide the combined flow measurement 144 using a single ECS output flow sensor.

In accordance with certain embodiments, the combined flow measurement 184 can be a sum of a first air flow measurement 158 and a second air flow measurement 182. It is contemplated that the second air flow measurement 182 can be provided a second air flow sensor 178 in communication with the second air conduit 104 at a location between union 122 and the compressor 110, and arranged to provide the second air flow measurement 182 to the controller based on the second air flow 34. As shown in FIG. 2 the first air flow measurement 158 and the second air flow measurement 182 are added to one another in a summing module 180, which add the first air flow measurement 158 to the second air flow measurement 182 to generate the combined flow measurement 184.

During operation of the ECS 100 employees the flow control valve 106, and in certain embodiments not more than the single flow control valve 106, to control both the first air flow 30 provided by the compressor section 22 and the second air flow 34 provided by the ambient air intake 32. For example, in certain embodiments the flow control valve 106 operates like a butterfly valve to increase or reduce the first air flow 30. As will be appreciated by those of skill in the art in view of the present disclosure, increase in the first air flow 30 increases the amount of work 121 applied to the compressor 110 by the turbine 108, which in turn increases the mass flow of the second air flow 34. Oppositely, decrease in the first air flow 30 decreases the amount of work 121 applied to the compressor 110 by the turbine 108, decreasing the mass flow of the second air flow 34. As will be also appreciated by those of skill in the art in view of the present disclosure, the mass flow rate of the first air flow 30 is controlled by the flow control valve 106 and dictates the mass flow rates of both the first air flow 30 and the second air flow 34 according modulation of the single flow control valve 106. Modulation of the singular flow control valve 106 is controlled by the controller 112 via the outer control loop module 142 and the inner control loop module 143.

Figure 3:
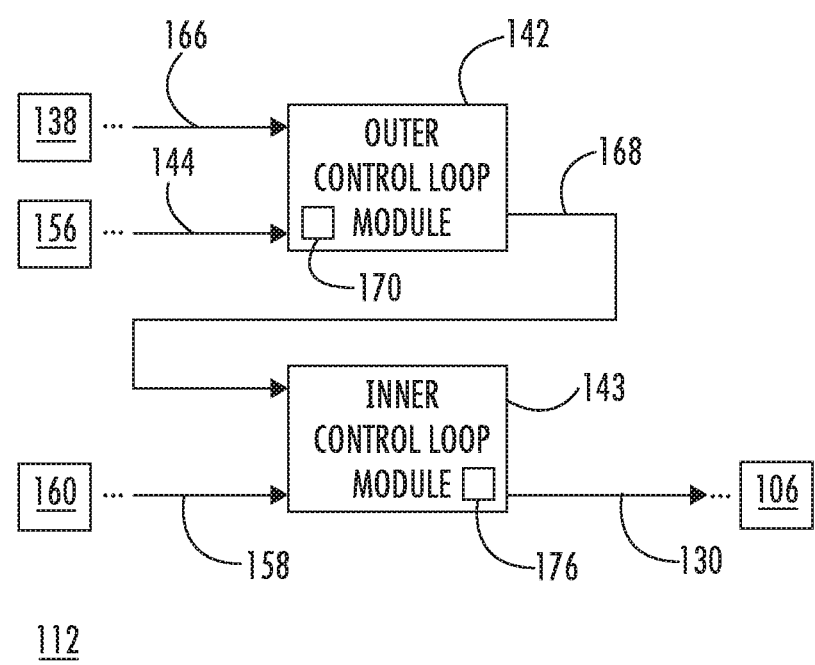
FIG. 3 is a schematic view of the outer control loop module and the inner control loop module of the ECS, showing inputs and outputs of the outer control loop module and the inner control loop module, respectively.

With reference to FIG. 3, controller 112 is shown in a logic diagram. The controller 112 includes the inner control loop module 143 cascaded with the outer control loop module 142. The outer control loop module 142 includes a proportion-integral (PI) control algorithm 170 and is configured to receive a target total flow value 166 and a combined flow measurement. As shown in FIG. 3 the target total flow value 166 is received from the memory 138 and the combined flow measurement 144 is received from the ECS output air flow sensor 156. It is to be understood and appreciated that outer control loop module 142 can received the combined flow measurement 184 (shown in FIG. 2). Based on the target total flow value 166 and the combined flow measurement 144 the outer control loop module 142 determine a first air flow reference value 168, which the outer control loop module 142 communicates to the inner control loop module 143.

The inner control loop module 142 includes a PI control algorithm 176 and is configured to receive the first air flow reference value 168 and the first air flow measurement 158, e.g., a bleed air flow measurement. The first air flow reference value 168 is received from the outer control loop module 142 and the first air flow measurement 158 is received from the first air flow sensor 160. Based on the first air flow reference value 168 and the first air flow measurement 158 the inner control loop module 143 determines the flow control valve command signal 130, which the inner control loop module 143 communicates to the flow control valve 106. Advantageously, employment of the PI control algorithm 170 and/or the PI control algorithm 176 provide a relatively slow response to change in either (or both) the first air flow 30 (shown in FIG. 1) and the ECS output air flow 18 (shown in FIG. 1), which tends to dampen high frequency changes in either (or both) the first air flow 30 and the ECS output air flow 18.

Figure 4:
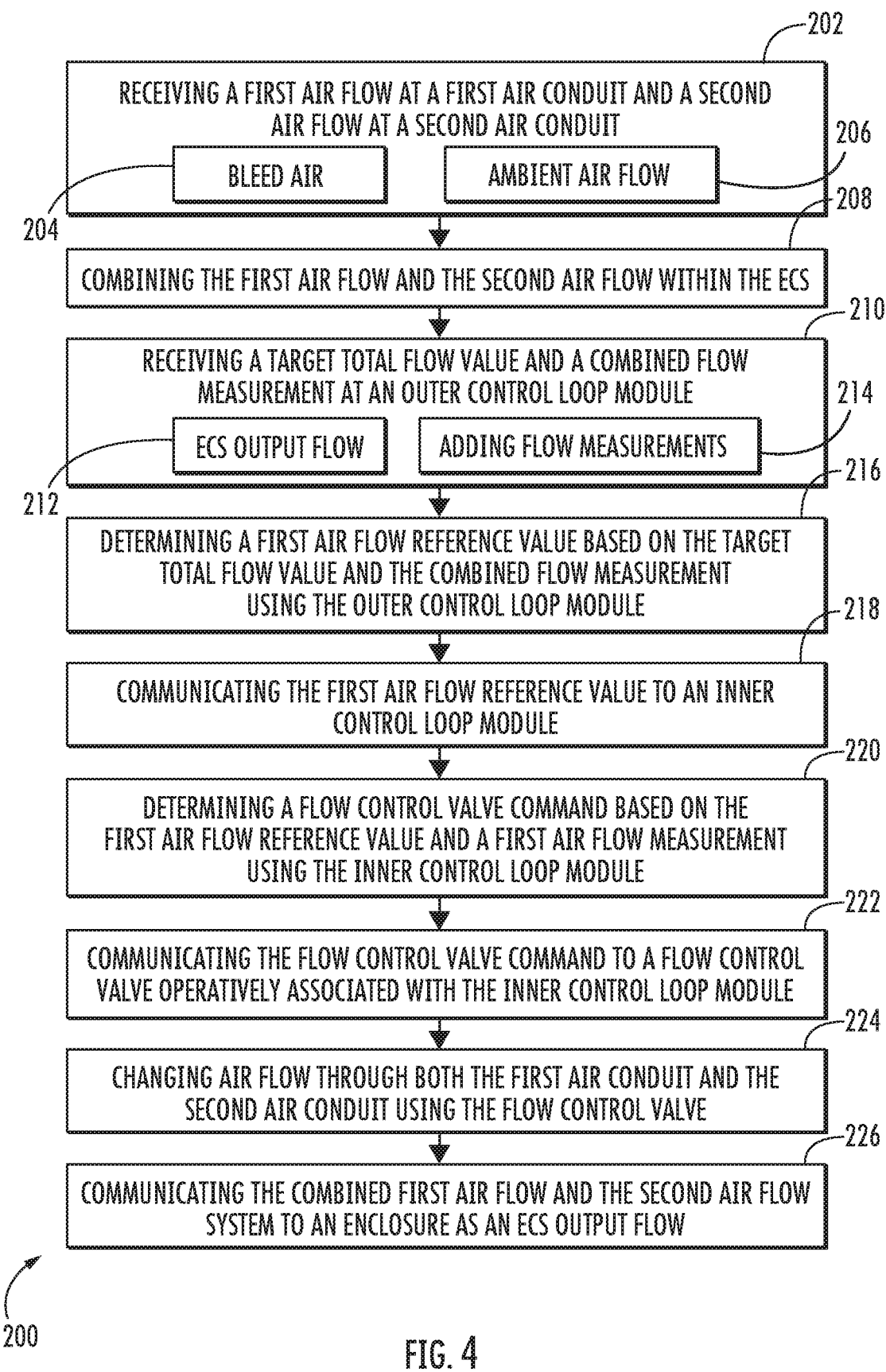
FIG. 4 is process flow diagram of a method of controlling air flow through an ECS, showing steps of the method.

Referring now to FIG. 4, a method 200 of controlling air flow in an ECS system, e.g., the ECS 100 (shown in FIG. 1), is shown. As shown with box 202, the method 200 includes receiving a first air flow at a first air conduit, e.g., the first air flow 30 (shown in FIG. 1) at the first air conduit 102 (shown in FIG. 2). The method also includes receiving a second air flow at a second air conduit, e.g., the second air flow 34 (shown in FIG. 1) at the second air conduit 104 (shown in FIG. 2). As shown with box 204, it is contemplated that the first air flow can be a compressed bleed air flow. As shown with box 206, it is also contemplated that the second air flow can be an uncompressed air flow. The first air flow and the second air flow are combined within the ECS to generate an ECS output air flow, e.g., the ECS output air flow 18 (shown in FIG. 1), as shown with box 208.

As shown with box 210, the method also includes receiving a target total flow value, e.g., the target total flow value 166 (shown in FIG. 3), at an outer control loop module, e.g., the outer control loop module 142 (shown in FIG. 3). A combined flow measurement, e.g., the combined flow measurement 144 (shown in FIG. 2) or the combined flow measurement 184 (shown in FIG. 2), is also received at the outer control loop module, as also shown with box 210. It is contemplated that that the combined flow measurement be representative of the ECS output air flow, e.g., the ECS output air flow 18 (show in FIG. 1), as shown with box 212. In certain embodiments the combined flow measurement is additionally determined from measurements acquired from the both the first air conduit and the second air conduits, e.g., by adding the first air flow measurement 158 (shown in FIG. 2) to the second air flow measurement 182 (shown in FIG. 2), as shown with box 214.

As shown with box 216, a first air flow reference value is determined based on the target total flow value and the combined flow measurement using the outer control loop module. The first air flow reference is communicated to an inner control loop module, e.g., the inner control loop module 143 (shown in FIG. 3), as shown with box 218. It is contemplated that the first air flow reference value be determined using a PI-control algorithm, e.g., the PI-control algorithm 170 (shown in FIG. 3).

As shown with box 220, a flow control valve command signal, e.g., the flow control valve command signal 130 (shown in FIG. 2). It is contemplated that the flow control valve command signal be determined based on the first air flow reference value and a first air flow measurement, e.g., the first air flow measurement 158 (shown in FIG. 2), as also shown by box 220. In certain embodiments the flow valve command signal can be determined using a PI control algorithm e.g., the PI control algorithm 176 (shown in FIG. 3). Further, the first air flow measurement can be a measurement of a bleed air flow carried by the first air conduit of the ECS.

As shown with box 222, the flow control valve command signal is communicated to a flow control valve, e.g., the flow control valve 106 (shown in FIG. 2), operatively associated with the inner control loop module. Based on the flow control valve signal the flow control valve changes air flow through both the first air conduit and the second air conduit of the ECS, as shown with box 224. The flows are thereafter combined and provided to an enclosure as the ECS output air flow, as show with box 226.

While the above description has described the flow process of FIG. 4 in a particular order, it should be appreciated that unless otherwise specifically required in the attached claims that the ordering of the steps may be varied. For example, the steps of the method 200 need not occur in series as illustrated in FIG. 4, the order of certain operations differing from that shown.

As described above, embodiments, such as the outer control loop module 142 and the inner control loop module 143, can be in the form of processor-implemented processes and devices for practicing those processes, such as a processor and/or a memory. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling air flow in an environmental control system (ECS) of an aircraft,
   wherein the ECS receives a first air flow from a compressor section of an aircraft engine of aircraft and a second airflow from an uncompressed ambient air intake;
   wherein a flow control valve controls both the first air flow provided by the compressor section and the second air flow provided by the ambient air intake;
   wherein: a first air conduit connects the compressor section to an enclosure of the aircraft through the flow control valve and turbine of the ECS; and a second air conduit connects the ambient air intake to a compressor of the ECS and therethrough to the enclosure; and union is located downstream of both the compressor outlet and the turbine outlet, wherein the union connects the second air conduit to the first air conduit, to combined the first air flow and the second air flow to form ECS output air flow, which is provided to the enclosure;
   wherein an ECS output air flow sensor is in communication with the first air conduit between the union and the enclosure and provides a combined flow measurement;
   wherein the flow control valve is configured for modulating a mass flow rate of the first air flow according to a flow control valve command signal received from a controller of the ECS; and
   wherein the controller includes a processor and a memory with a plurality of program modules recorded thereon, the plurality of program modules include an outer control loop module cascaded with an inner control loop module for modulating the mass flow rate of the first air flow and the second air flow through the first air conduit and the second air conduit,
   the method, comprising:
   receiving a target total flow value, representing the desired value of total flow from the ECS, and a combined flow measurement at the outer control loop module;
   determining a first air flow reference value based on the target total flow value and the combined flow measurement using the outer control loop module;
   communicating the first air flow reference value to the inner control loop module;
   determining the flow control valve command signal based at least in part on the first air flow reference value using the inner control loop module; and
   communicating the flow control valve command signal to the flow control valve operatively associated with the inner control loop module to control the first air flow through the first air conduit and the second air flow through the second air conduit of the ECS,
   wherein the control valve is a single control valve so that the mass flow rate of the first air flow is controlled by the flow control valve, which dictates the mass flow rates of both the first air flow and the second air flow according to modulation of the single flow control valve.

2. The method as recited in claim 1, further comprising changing air flow through both the first air conduit and the second air conduit using the flow control valve.

3. The method as recited in claim 1, wherein receiving the combined flow measurement comprises receiving a measurement of ECS output air flow to an aircraft cabin.

4. The method as recited in claim 1, wherein receiving the combined flow measurement comprises receiving a first air flow measurement and a second air flow measurement, the method further comprising adding the first air flow measurement to the second air flow measurement.

5. The method as recited in claim 1, wherein the combined flow measurement indicates air flow through a bleed air conduit and an ambient air conduit of the ECS.

6. The method as recited in claim 1, wherein the first air flow is a bleed air flow, wherein the second air flow is an ambient air flow.

7. The method as recited in claim 1, wherein determining the first air flow reference value comprises employing a proportional-integral control algorithm.

8. The method as recited in claim 1, wherein determining the flow control valve command comprises employing a proportional-integral control algorithm.

9. An environmental control system, comprising:
   a first air conduit and a second air conduit;
   a turbine in fluid communication with the first air conduit;
   a compressor in fluid communication with the second air conduit, wherein the compressor is operatively associated with the turbine;
   a flow control valve arranged along the first air conduit; and
   a controller having an inner control loop module cascaded with an outer control loop module, the controller operatively connected to the flow control valve and responsive to instructions recorded on a memory to:
   receive a target total flow value and a combined flow measurement at the outer control loop module;
   determine a first air flow reference value based on the target total flow value and the combined flow measurement using the outer control loop module;

communicate the first air flow reference value to the inner control loop module;

determine a flow control valve command based at least in part on the first air flow reference value using the inner control loop module; and communicate the flow control valve command to the flow control valve, wherein the control valve is a single control valve so that a mass flow rate of a first air flow is controlled by the flow control valve, which dictates the mass flow rates of both the first air flow and a second air flow according to modulation of the single flow control valve.

10. The environmental control system as recited in claim 9, further comprising a compressor section of a gas turbine engine connected to the first air conduit by a bleed valve.

11. The environmental control system as recited in claim 9, further comprising an ambient air intake connected to the second air conduit.

12. The environmental control system as recited in claim 9, further comprising a union connecting the second air conduit to the first air conduit.

13. The environmental control system as recited in claim 12, wherein the turbine has a turbine outlet, wherein the union is arranged downstream of the turbine outlet.

14. The environmental control system as recited in claim 12, wherein the compressor has a compressor outlet, wherein the union is arranged downstream of the compressor outlet.

15. The environmental control system as recited in claim 12, further comprising a combined flow sensor arranged between the union and an enclosure connected to the ECS.

16. The environmental control system as recited in claim 12, further comprising:

a first air flow sensor in communication with the first air conduit, the first air sensor arranged to provide a first air flow measurement of a first air flow in the first air conduit; and a second air flow sensor in communication with the second air conduit, the second air flow sensor arranged to provide a second air flow measurement of a second air flow in the second air conduit, wherein the instructions further cause the controller to provide the combined flow measurement to the outer control module by adding the first air flow measurement to the second air flow measurement.

17. The environmental control system as recited in claim 9, further comprising a first air flow sensor in communication with the first air conduit and arranged provide the first air flow measurement to the inner control module.

18. The environmental control system as recited in claim 9, wherein the outer control loop module comprises a proportional-integral control algorithm, wherein the inner control loop module comprises a proportional-integral control algorithm.

19. A computer program product tangibly embodied on a computer readable medium, the computer program product including instructions that, when executed by a processor, cause the processor to perform operations comprising:

receiving a target total flow value at an outer control loop module;

receiving a combined flow measurement at the outer control loop module;

determining a first air flow reference value based on the target total flow value and the combined flow measurement using the outer control loop module;

communicating the first air flow reference value to an inner control loop module;

determining a flow control valve command based at least in part on the first air flow reference value using the inner control loop module; and communicating the flow control valve command to a flow control valve operatively associated with the inner control loop module, wherein the control valve is a single control valve so that a mass flow rate of the first air flow is controlled by the flow control valve, which dictates the mass flow rates of both the first air flow and a second air flow according to modulation of the single flow control valve.

* * * * *